3,850,897
PROCEDURE FOR THE PRODUCTION OF POLY-
MERS AND COPOLYMERS OF ISOBUTYLENE
Aldo Priola, Sebastiano Cesca, and Giuseppe Ferraris,
San Donato Milanese, Italy, assignors to Snam Progetti
S.p.A., San Donato Milanese, Italy
No Drawing. Filed Nov. 17, 1972, Ser. No. 307,499
Claims priority, application Italy, Nov. 26, 1971,
31,727/71
Int. Cl. C08d 1/26, 3/04, 3/10
U.S. Cl. 260—85.3 R                              18 Claims

ABSTRACT OF THE DISCLOSURE

A process is described whereby homopolymers and co-polymers of isobutylene are prepared by effecting the polymerization at a temperature in the range of $-100°$ to $30°$ C. in the presence of a catalyst system including:

(i) a metallorganic compound of aluminum of the formula $$RAl(YR')X$$

in which R is a member of the group consisting of hydrogen, alkyl, cycloalkyl and aryl; R' is a hydrocarbon radical selected from those listed for R; Y is oxygen, or sulphur, or nitrogen bound to the hydrocarbon radicals; X is halogen; and (ii) a co-catalyst selected from
 (a) Brönsted acids
 (b) alkyl haloids, haloids of organic or inorganic acids, or compounds containing atoms of activated halogen,
 (c) Lewis acids
 (d) Compounds of the formula $X'_nMeY'_m$ in which X' is halogen; Y' is oxygen, sulphur or a functional group selected from alkoxys, esters, amides, alkyls, cycloalkyls, aromatics, arenes, phosphines, acetylacetones and oximes; Me is a metal chosen from Ti, Sn, Zn, Si, B, Al, Hg, Pb, W, Sb, Ge, V, Zr, As, Bi and Mo; and $m$ and $n$ are whole numbers whose sum is equal to the value of Me.

The process is of particular value in the production of butyl rubber through the copolymerization of isobutylene and isoprene.

---

This invention relates to a procedure for the production of polymers and copolymers of isobutylene through the use of a particular catalyst system which enables us to utilize higher reaction temperatures than those previously used industrially; it also enables use to obtain higher yields in polymers having a higher molecular weight and generally better properties, logically dependent upon the operating conditions selected and other factors known to those skilled in the art.

More particularly, this invention relates to an invention for the production of butyl rubber.

It is well known that butyl rubber is industrially produced by means of a process of co-polymerization achieved by utilizing cationic type initiators. In particular the co-polymerization is effected by using $AlCl_3$ in a solution of ethyl chloride or methyl chloride solution at $-100°$ C.

The use of a solid catalyst insoluble in common hydrocarbon solvents and only slightly soluble in chloride solvents, has created many difficulties in the realization of an efficacious control of this reaction. The preparation of the catalyst solution itself is somewhat complex, and in general, it is realized by the passage of a current of ethyl chloride or methyl chloride on a bed of solid aluminum trichloride. Also the determination subsequently, of the concentration of the catalyst that is achieved through titration of the $AlCl_3$ is very complex and often gives very unreliable results. It is evident from the above that recently there has been much effort on the part of various researchers and industries interested in the production of this type of rubber, towards the discovery of new catalyst systems that would simultaneously solve the problems of the dosage for the catalyst and an increase in the temperature of the polymerization, without of course, compromising the properties of the rubber and, in particular, without lowering the value of the molecular weight. Recently, some researchers perfected a new system of soluble catalyst that enables us to obtain butyl rubber with a high molecular weight at considerably higher temperature than those normally used in industrial processes.

The system in question is based upon a combination of a modified Friedel-Crafts haloid for example $AlEt_2Cl$, with an appropriate co-catalyst. These haloids are not usually capable of initiating the polymerization of isobutylene by themselves, or in mixtures of iso-butylene-dienemonomers or other monomers that normally polymerize with a cationic type mechanism.

The polymerization or co-polymerization begins only when the co-catalyst is introduced. This co-catalyst may be composed of a substance able to produce protons, such as, for example, HCl and other Brönsted acids, or by a substance capable of supplying carbon ions, such as, for example t-butyl chloride.

The same applicant, owns a patent application pertaining to a procedure for the production of butyl rubber by means of the use of a catalyst system constituted by a reducing aluminum compound and by a co-catalyst capable of giving cations for interaction with the catalyst. The co-catalyst may be a halogen introduced as such, or other interhalogenic compounds. The process which has now been perfected by the applicant and which is the subject of this application, presents all the advantages of the catalyst systems mentioned previously and which are essentially characterized by considerable ease of the control of the polymerization reaction owing to the solubility of these catalysts in common organic solvents, so that, whenever necessary, it is possible to operate with minimum quantities of solvent, even in its total absence in which case, the same non-reacted monomer functions as a diluent. In respect to the process using haloids of dialkyl aluminum and strong acids, it also has the advantage of obtaining products of equal or sometimes higher molecular weight, and even higher reaction temperatuers. It also has major regularity in the polymerization process, permitting, in fact, a major control of the temperature and therefore a higher regularity in the polymers produced.

Then, in respect to the systems using halogen or interhalogenic compounds, it has the great advantage of easier handling of the compounds used as catalysts.

Besides, it has the advantage of major ease in dosing the co-catalyst, eventually, even during the polymerization, as compared to the Brönsted acids, and greater economy compared to the co-catalysts constituted by alkyl haloids, especially in view of the high purity they must possess. Although this application essentially concerns the production of butyl rubber, in view of the industrial interest in this, it will be easy for those skilled in the art, using the catalyst system described herein, to find the ideal conditions for the copolymerization of different monomers.

In particular, the usable monoolefine may include 4 to 7 carbon atoms ($C_4$–$C_7$), while the multiolefine is generally constituted a by diolefine conjugated with a number of carbon atoms ranging from 4 to 14 ($C_4$–$C_{14}$), such as isoprene, butadiene, 2,3 dimethyl 1,3 butadiene, while examples of the first may be isobutene 2-methyl butene-1, 3-methyl-butene-1, 2-methyl-butene 2, 4-methyl-pentene-1.

As noted above, only great industrial interest has prompted us to limit our examples to the case of butyl rubber, that is, to the copolymerization of isobutylene and isoprene in quantities variable from 90 to 99.5% isobutylene by weight and from 10 to 0.5% isoprene by weight.

The reaction media used are those which are normally used in the technical field, i.e., ethyl chloride, methyl chloride or methylene chloride.

However, it is also possible to use hydrocarbide compositions that are liquid at the temperature of reaction, such as pentane, isopentane, n-heptane, cyclohexane or even solvents maintained in a liquid phase at the temperature of reaction such as, for example, the monomer or monomers used. The molecular weights of the product obtained vary over a considerable range according to the conditions adopted.

The catalyst system used in the polymerization procedure of this invention includes essentially a metallorganic compound of aluminum having the general formula RAl(YR')X or an aluminum compound containing no Al—C bond and having the general formula Al(YR'')X$_2$ in which R is hydrogen, or an alkyl residue, cycloalkyl, aryl, simple or substituted; R' and R'' are hydrocarbon radicals selected from those listed for R and R'', may be an acyl radical also; Y is an atom of oxygen or sulphur, or it can be nitrogen, in which case it will be bound to two hydrocarbon radicals, X is an atom of halogen.

The use of the above mentioned compound of aluminum, which also involves a lower cost, easier handling and safety because of its total absence of inflammability, is in association with a particular co-catalyst selected from the following classes:

(a) Brönsted acids, for example HCl, H$_2$O, CCl$_3$COOH, (b) Alkyl haloids, haloids of organic or inorganic acids, or compounds containing atoms of activated halogen.

(c) Lewis acids (d) Compounds of the formula X'$_n$MeY'$_m$ in which X' is halogen atom; Y' is oxygen, sulphur or a functional group selected for example from the alkoxys (—OR), esters, (—O—COR), amides (—NR$_2$), alkyls (—R) simple or substituted, cycloalkyls (—C), aromatics (Ar), arenes, (delocalized bonds between pseudo-aromatic rings or aromatics and transition metals), phosphines (—PR$_2$), acetyl-acetones, (—COCH$_2$COCH$_2$R), oximes (=C=N—O)

where R has the above reported meanings; Me is a metal selected from the following; Ti, Sn, Zn, Si, Al, Hg, Pb, W, Sb, Ge, V, Zr, As, Bi, Mo; $n$ and $m$ are whole numbers whose sum is equal to the valency of Me, except in the case in which Y is oxygen or sulphur, when it becomes $2m+n$; when considering aluminium compounds having the formula (2) $m$ may be zero also.

Illustrative examples of this latter case are given by the following compounds.

AlCl$_2$(OCH$_3$),
AlBr$_2$(OCH$_3$),
AlCl$_2$(OC$_2$H$_5$),
AlBr$_2$(OC$_2$H$_5$),
AlI$_2$(OCH$_3$),
AlCl$_2$O(n—C$_3$H$_7$),
AlCl$_2$(OC$_6$H$_5$),
AlCl$_2$(OCOCCl$_3$),
AlCl$_2$(On—C$_4$H$_9$).

The polymerization reaction according to our invention is conducted at a temperature in the range between —100 and +30° C.

The molecular ratio between the total quantity of cocatalyst and the aluminum compound is less than to 1, and is generally between 0.5 and 10$^{-4}$; the components of the catalyst system can be added separately or can be contacted before being introduced into the reactor.

The molecular weights of the polymers prepared in the following examples were obtained through viscosimetric measures of polymer solutions in cyclohexane at 30° C.

After having determined the intrinsic viscosity by extrapolation at C=O of the curves ln $\eta$/c. and $\eta_{sp.}$/c. the average molecular weight of the single polymers was calculated by the following equation:

$$\ln M_v = 11.98 + 1.452 \ln[\eta]$$

The invention will be more clearly comprehensible from consideration of the following examples, to which, however, it should not be understood to be limited.

EXAMPLE 1

In a tubular reactor completely made of glass, having a capacity of 300 cm.$^3$, provided with a mechanical agitator and a thermometric sheath, previously heated with flame under a dry Argon flow, and maintained during the execution of the experiment, under a slight overpressure of Argon (20–30 torr in respect to the atmospheric pressure), we condensed 80 cm.$^3$ of CH$_3$Cl, and then we introduced 28.4 g. of isobutene, 0.84 g. of isoprene and 2 mmoles of AlEt(OEt)Cl bringing the temperature to —40° C. by means of a thermostatic bath. To the reaction mixture, kept under strong shaking, are subsequently added 0.1 mmoles of TiCl$_4$ dissolved in 5 cc. of CH$_3$Cl gradually over a period of 10 minutes for which we had an increase in the temperature of the reaction mixture in the amount of 4° C. We continued the shaking for 10 minutes after the end of the addition and we stopped the reaction by adding methanol to the suspension of the polymer which is produced. We obtained 19.5 g. of dry polymer (Yield=68.5%) which presents a value of [$\eta$] determined in cyclohexane, equal to 1.80 dl./g. which corresponds to an average viscosimetric molecular weight equal to 360,000 and a content of unsaturations, determined iodometrically, corresponding to 3.05% isoprene by weight.

The polymer obtained was subjected to vulcanization in split plates using a mixture of the following composition prepared on an open air mixer with cylinders:

|   | Parts |
|---|---|
| Polymer | 100 |
| EPC black | 50 |
| Antioxidant 2248 | 1 |
| ZnO | 5 |
| Stearic Acid | 3 |
| Sulphur | 2 |
| MB–TDS (mercapto-benzothiazole-disulfide) | 0.5 |
| TMTD (tetramethyl-thiurame-disulfide) | 1 |

The mixture was vulcanized at 153° C. for 40 and 60 minutes. The properties of the vulcanized products obtained are set forth in Table 1, in Table 2 we present for the sake of comparison, the properties of a commercial type of butyl rubber determined under the same conditions.

TABLE 1

| | | |
|---|---|---|
| Vulcanization time (minutes) | 40 | 60 |
| Modulus at 100% (kg./cm.$^2$) | 15 | 17 |
| Modulus at 200% (kg./cm.$^2$) | 25 | 29 |
| Modulus at 300% (kg./cm.$^2$) | 42 | 52 |
| Breaking load (kg./cm.$^2$) | 205 | 204 |
| Ultimate elongation (percent) | 725 | 680 |
| Permanent set (percent) | 41 | 40 |

TABLE 2

| | | |
|---|---|---|
| Vulcanization time* (minutes) | 40 | 60 |
| Modulus at 100% (kg./cm.$^2$) | 15 | 16 |
| Modulus at 200% (kg./cm.$^2$) | 27 | 33 |
| Modulus at 300% (kg./cm.$^2$) | 47 | 58 |
| Breaking load (kg./cm.$^2$) | 209 | 210 |
| Ultimate elongation (percent) | 715 | 650 |
| Permanent set (percent) | 29 | 29 |

*Butyl rubber Enjay B 218 with a viscosimetric molecular weight equal to approximately 450,000 and contents of unsaturations equal to 2.15% in isoprene by weight.

The above reported results show that the polymer obtained in this experiment conducted at a temperature between −36° and −40° C. presents, after vulcanization, properties equal to those of commercial butyl rubber, which as known, is produced at a temperature inferior to −100° C.

EXAMPLE 2

We operated under the same conditions and with the same quantities of reagents as described in the previous example with the difference that we used as a co-catalyst a solution in $CH_3Cl$ containing 0.26 mmoles of $$Ti(On.C_4H_9)—Cl_3$$

The experiment was conducted at a temperature of −40° C. and the addition of the co-catalyst was graduated over a period of eleven minutes for which we had an increase in temperature in the amount of 2° C. We obtained 13.65 g. of dry polymer (yield=48%) having $[\eta]$ equal to 1.98 dl./g. corresponding to an average viscosimetric PM equal to 410,000 or a content of unsaturations corresponding to 2.8% in isoprene weight. The polymer was subjected to vulcanization according to the methods described in Example 1 and the properties of the vulcanized products obtained are reported in Table 3.

TABLE 3

| Vulcanization time (minutes) | 40 | 60 |
|---|---|---|
| Modulus at 100% (kg./cm.²) | 15 | 16 |
| Modulus at 200% (kg./cm.²) | 28 | 29 |
| Modulus at 300% (kg./cm.²) | 48 | 56 |
| Breaking load (kg./cm.²) | 218 | 210 |
| Ultimate elongation (percent) | 730 | 710 |
| Permanent set (percent) | 38 | 33 |

EXAMPLE 3

With the same methods described in Example 1, we introduced into the reactor the same quantities of solvent, monomers and AlEt(OEt)Cl.

The reaction was started at a temperature of −40° C. by means of gradual introduction of a solution of $CH_3Cl$ containing 0.1 mmoles of $SnCl_4$ for a period of 4 minutes for which we had an increase in temperature in the amount of 4° C. We obtained the formation of 20.4 g. of dry polymer (yield=72%) having a $[\eta]$ equal to 1.40 dl./g. ($Pm_4$=250,000) and an unsaturation content equal to 2.25% in isoprene by weight.

The polymer was subjected to vulcanization as described in the previous example, and the properties of the vulcanized product were similar to those set forth in Table 3.

EXAMPLE 4

We repeated the previous experiment under the same conditions with the difference that we used as a co-catalyst, 0.2 mmoles of $VOCl_3$ dissolved in 5 cc. of $CH_3Cl$. The addition was carried out over a period of nine minutes for which we had an increase in temperature of the reaction mixture in the amount of 5° C. We obtained 19.2 g. of dry polymer (yield=67%) having a $[\eta]$=1.36 dl./g. ($PM_v$=240,000), a content of unsaturations equal to 1.66% in isoprene by weight and physical properties similar to those reported for the sample in Example II.

EXAMPLE 5

We operated with the same methods and with the same quantities of reagents as reported in the previous example, with the difference that we operated at a temperature of −50° C. and we used as a catalyst a solution of tert-butyl-chloride containing 0.1 mmoles of product in 5 cc. of solvent.

We carried out the addition slowly for a period of eight minutes for which we had a temperature increase corresponding to 3° C. We obtained gr. 21.4 of dry polymer (yield=75.5%) having $[\eta]$ equal to 1.36 dl./g. ($PM_v$=230,000) and an isoprene content equal to 3.1% in weight.

EXAMPLE 6

We repeated the previous example with the difference that we operated at a temperature of −40° C. and we used as co-catalyst a solution containing 0.07 mmoles of HCl in 5 cm.³ of $CH_3Cl$. The addition of the co-catalyst was carried out over a period of three minutes for which we had an increase in temperature of the reaction mixture in the amount of 16° C.

We obtained 18.6 g. of dry polymer (yield=65.5%) having $[\eta]$ equal to 1.37 dl./g. ($PM_v$=235,000) contents of unsaturation equal to 3.2% in isoprene by weight and physical properties that after vulcanization were similar to the sample reported in example 2.

EXAMPLES 7 TO 15

Operating as described above, we executed copolymerizations of isobutene and isoprene using different catalyst systems.

The reaction conditions were the same as those stated in the previous examples, while the catalysts used and the results obtained are reported in the following Table 4.

TABLE 4

| Catalyst | Cocatalyst | Yield, percent | $PM_v$ (copolymer obtained) |
|---|---|---|---|
| (1) Al isobut (O isobut) Cl, 2 mmoles. | T-butylchloride, isobuset. 0.2 mmoles. | 52 | 150,000 |
| (2) Al isobut (O isobut) Cl, 2 mmoles. | T-butylbromide, 0.2 mmoles. | 40 | 130,000 |
| (3) Al isobut (O isobut) Cl, 2 mmoles. | $TiCl_4$, 0.1 mmoles. | 51 | 320,000 |
| (4) AlEt (OEt) Br, 2 mmoles. | T-butylchloride, 0.2 mmoles. | 40 | 120,000 |
| (5) AlEt (OEt) Br, 2 mmoles. | $SnCl_4$, 02 mmoles. | 45 | 220,000 |
| (6) AlEt (OEt) I, 2 mmoles. | $TiCl_4$, 0.2 mmoles. | 25 | 160,000 |
| (7) AlEt (SEt) Cl, 2 mmoles. | $SnCl_4$, 0.5 mmoles. | 22 | 110,000 |
| (8) AlEt (OEt) Br, 2 mmoles. | HBr, 0.1 mmoles. | 60 | 180,000 |
| (9) AlEt (OEt) Br, 2 mmoles. | $TiCl_3$ (O n but), 0.3 mmoles. | 45 | 360,000 |

EXAMPLE 16

In a tubular reactor completely made of glass, having a capacity of 300 cm.³, provided with a mechanical stirrer and a thermometric sheath, previously heated with flame under a dry Argon flow and maintained, during the execution of the experiment, under a slight overpressure of Argon (20–30 torr in respect to the atmospheric pressure), we condensed 60 cm.³ of anhydrous $CH_3Cl$ and 60 cm.³ (42.6 g.) of isobutene, then we introduced 1.8 cm.³ of freshly distilled isoprene bringing the temperature to −40° C. by means of a thermostatic bath. To the reaction mixture, kept under strong stirring, are subsequently added 5 cm.³ of a $CH_3Cl$ solution containing 0.5 mmole of $AlCl_2OCH_3$ and 0.04 mmole of $TiCl_4$ mixed at −80° C.: the addition was carried out gradually over a period of 10 minutes, for which we had an increase in the temperature of 9° C. We continued the shaking for 10 minutes after the end of the addition and we stopped the reaction by adding methyl alcohol to the suspension of the polymer which was produced. We obtained 22.5 g. of dry polymer (yield=52.7%) which presented a value of $[\eta]$, determined in cyclohexane, equal to 2.01 dl./g., corresponding to an average viscosimetric molecular weight equal to 420,000 and a content of unsaturation, determined iodometrically, corresponding to 1.96% in isoprene by weight.

The polymer obtained was subjected to vulcanization in split plates using a mixture of the following composition prepared on an open air mixing roll:

|  | Parts |
|---|---|
| Polymer | 100 |
| EPC Black | 50 |
| Antioxidant 2246 | 1 |
| ZnO | 5 |
| Stearic acid | 3 |
| Sulphur | 2 |
| MB TDS (mercapto-benzothiazole-disulfide) | 0.5 |
| TMTD (Tetramethyl-thiurame-disulfide) | 1 |

The mixture was vulcanized at 153° C. for 40 and 60 minutes. The properties of the vulcanized products are set forth in table 5; in table 6 we present, for the sake of comparison, the properties of a commercial type of butyl rubber determined under the same conditions:

TABLE 5

| Vulcanization time (minutes) | 40 | 60 |
|---|---|---|
| Modulus at 100% (kg./cm.²) | 14 | 16 |
| Modulus at 200% (kg./cm.²) | 26 | 33 |
| Modulus at 300% (kg./cm.²) | 46 | 58 |
| Breaking load (kg./cm.²) | 209 | 212 |
| Elongation at break (percent) | 725 | 660 |
| Permanent set (percent) | 38 | 33 |

TABLE 6

| Vulcanization time* (minutes) | 40 | 60 |
|---|---|---|
| Modulus at 100% (kg./cm.²) | 15 | 16 |
| Modulus at 200% (kg./cm.²) | 27 | 33 |
| Modulus at 300% (kg./cm.²) | 47 | 58 |
| Breaking load (kg./cm.²) | 221 | 210 |
| Elongation at break (percent) | 715 | 650 |
| Permanent set (percent) | 29 | 29 |

*Butyl rubber Enjay B 218 with a viscosimetric molecular weight equal to approximately 450,000 and content of unsaturations equal to 2.15% in isoprene by weight.

The above reported results show that the polymer obtained in this experiment conducted at a temperature included between −31° and −40° C. presents, after vulcanization, properties equal to those of commercial butyl rubber, which, as known, is produced at a temperature inferior to −100° C.

EXAMPLE 17

The experiment carried out in example 16 was repeated but a catalyst was employed consisting of a solution containing 0.5 mmole of $AlCl_2 \cdot OCH_3$ as such in $CH_3Cl$. The addition of the solution was performed according to the same modalities and a small amount of polymer was formed (4.1 g. at a yield=9.8%) having a viscosimetric molecular weight equal to 390,000 and content of unsaturations corresponding to 2.2% in isoprene by weight.

In the same way, when the previous experiment is carried out employing as catalyst a solution containing 0.04 mmole of $TiCl_4$ in $CH_3Cl$, no polymer formation is observed.

This showed that only mixing the two components of the catalyst system allowed a high polymer yield to be obtained.

EXAMPLE 18

We operated under the same conditions and with the same quantities of solvent and monomers as described in Example 16. The reaction was started at the temperature of −35° C. by gradually introducing a solution containing 0.35 mmole of $AlCl_2OCH_3$ and 0.05 mmole of $TiCl_4$ mixed at −80° C.; the addition was performed gradually over a period of 5 minutes, for which we had an increase in the temperature of 3° C. We obtained 26.16 g. of dry polymer (yield=61.3%) having $[\eta]=1.65=dl./g.$ (M.W.=315,000) and isoprene content equal to 2.4% in weight.

The polymer was vulcanized according to the procedure referred to in Example 16, and the properties of the vulcanized products obtained were similar to the ones of the sample of Example 16 (see table 7):

TABLE 7

| Vulcanization time (minutes) | 40 | 60 |
|---|---|---|
| Modulus at 100% (kg./cm.²) | 14 | 20 |
| Modulus at 200% (kg./cm.²) | 28 | 44 |
| Modulus at 300% (kg./cm.²) | 47 | 62 |
| Breaking load (kg./cm.²) | 203 | 196 |
| Elongation at break (percent) | 720 | 590 |
| Permanent set (percent) | 41 | 53 |

EXAMPLE 19

We repeated the experiment of Example 16 but we worked at the temperature of −40° C. and employed as catalyst a solution containing 0.5 mmole of $AlCl_2OCH_3$ and 0.05 mmole of $SnCl_4$ in 5 cc. of $CH_3Cl$ mixed at −80° C. The addition was performed gradually over a period of 5 minutes for which we had an increase in the temperature of 3° C. The reaction was stopped after other 3 minutes and 21.3 g. of dry polymer were obtained (yield=50%) having $[\eta]=1.73$ dl./g. (viscosimetric M.W.=340,000) and an isoprene content, determined by iodometrically may, equal to 2.08% in weight.

The properties of the vulcanized products obtained from the aforesaid sample according to Example 16 are reported in table 8.

TABLE 8

| Vulcanization time (minutes) | 40 | 60 |
|---|---|---|
| Modulus at 100% (kg./cm.²) | 15 | 17 |
| Modulus at 200% (kg./cm.²) | 31 | 37 |
| Modulus at 300% (kg./cm.²) | 51 | 64 |
| Breaking load (kg./cm.²) | 198 | 198 |
| Elongation at break (percent) | 670 | 590 |
| Permanent set (percent) | 38 | 34 |

Where the above experiment was repeated but use was made of a catalyst consisting of 0.05 mmole of $SnCl_4$ as such, no polymer was formed.

EXAMPLE 20

By working according to Example 16, an equal amount of solvent and isobutene and 2.7 cm.³ of isoprene were introduced into the reactor. The reaction was started by a following addition at −35° C. of 0.27 mmole of $AlCl_2OCH_3$ and 0.05 mmole of $SnCl_4$. As soon as $SnCl_4$ was added to the solution, we had an increase in the temperature of 2° C. and, after reacting for another 10 minutes, 8.4 g. of dry polymer were obtained (yield= 19.7%) having $[\eta]=1.64$ dl./g. (M.W.=315,000) and unsaturation content corresponding to 3.2% in isoprene by weight. The properties of the vulcanized products obtained from this sample were very similar to those of the commercial butyl rubber having a high unsaturation content.

EXAMPLE 21

We operated according to Example 16 with the same quantities of solvent, isobutene and isoprene.

The reaction was started at −40° C. by adding a $CH_3Cl$ solution containing 0.5 mmole of $AlCl_2OC_2H_5$ and 0.03 mmole of $AlCl_3$ for a period of 8 minutes for which we had an increase in the temperature of 2° C. The stirring was protracted for 10 minutes for which 23.7 g. of dry polymer were obtained, at the end of the reaction (yield= 55.5%) having $[\eta]=2.1$ dl./g. (M.W.=450,000) and an isoprene content equal to 1.75% in weight.

The properties of the vulcanized products obtained from this sample as described in Example 16 are reported on table 9.

TABLE 9

| Vulcanization time (minutes) | 40 | 60 |
|---|---|---|
| Modulus at 100% (kg./cm.²) | 14 | 16 |
| Modulus at 200% (kg./cm.²) | 28 | 32 |
| Modulus at 300% (kg./cm.²) | 48 | 54 |
| Breaking load (kg./cm.²) | 213 | 214 |
| Elongation at break (percent) | 690 | 650 |
| Permanent set (percent) | 38 | 35 |

When the above experiment was repeated but use was made of a catalyst consisting only of the solution containing 0.5 mmole of $AlCl_2OC_2H_5$, only a small amount of polymer (yield=8.5%) was obtained having a viscosimetric molecular weight equal to 370,000 and an isoprene content equal to 1.9% by weight.

When use was made of the solution containing 0.03 mmole of $AlCl_3$ as such, only a small amount of polymer was formed (yield=9.5%) having quite unsatisfactory properties from a practical point of view (viscosimetric molecular weight=165,000).

EXAMPLE 22

We repeated the experiment referred to in Example 16 but worked at −35° C. and used 60+60+2.7 cm.³ of CH₃Cl, isobutene and isoprene respectively.

The reaction was started by gradually adding over a period of 5 minutes a solution in 5 cm.³ of CH₃Cl containing 0.35 mmole of AlCl₂OCH₃ and 0.01 mmole of AlEtCl₂ mixed at −80° C. During the addition we had an increase in the temperature of 3° C. and, at the end of the reaction, 15.1 g. of polymer were obtained, yield= 35.5%, having [η]=1.51 dl./g. (M.W.=280,000) and an isoprene content equal to 3.5% by weight. The properties of the copolymer after vulcanization were very similar to the ones of the commercial butyl rubber having a high unsaturation content.

When the above experiment was repeated by employing a catalyst consisting of 0.01 mmole of AlEtCl₂ as such, only a small amount of polymer was obtained (yield=4.2%) having a quite unsatisfactory viscosimetric molecular weight (M.W.=140,000).

EXAMPLE 23

We operated according to Example 22, with the same quantities of solvent and monomers but at the temperature of −40° C. The reaction was started by gradually adding over a period of 5 minutes a solution in 5 cm.³ of CH₃Cl containing 0.5 mmole of AlCl₂OCH₃ and 0.02 mmole of t-butyl chloride mixed at −80° C.

During the addition we had an increase in the temperature of 2° C. and, at the end of the reaction we obtained 13.8 g. of polymer (yield=32.5%) having [η]=1.57 dl./g. (M.W.=290,000) and an isoprene content equal to 3.2% by weight.

The properties of the copolymer obtained were similar to the ones of the commercial butyl rubber having a high unsaturation content.

EXAMPLE 24

By working according to example 16, use was made of the same amounts of solvent and monomers at the temperature of −40° C. The reaction was started by a gradual addition of a solution in 5 cm.³ of CH₃Cl containing 0.5 mmole of AlBr₂OCH₃ and 0.04 mmole of TiCl₄ mixed at −80° C. We had an increase in the temperature of 4° C. and the formation, at the end of the reaction, of 18.5 g. of polymer (yield=43.4%) having [η]=1.74 dl./g.) (M.W.=340,000) and an isoprene content equal to 2.1% by weight.

What we claim is:

1. Process for the production of copolymers of isobutylene and a conjugated diene, wherein the copolymerization reaction is conducted in the presence of a catalyst system consisting essentially of: (i) a metalorganic compound of aluminum represented by the formula RAl(YR')X in which R is hydrogen, cycloalkyl, or aryl; R' is a hydrocarbon radical selected from those listed for R; Y is an atom of oxygen, or of sulphur, or nitrogen bound to two hydrocarbon radicals; and X is an atom of halogen; and (ii) a co-catalyst selected from the following:
   (a) Brönsted acids;
   (b) alkyl haloids, haloids of organic or inorganic acids, or compounds containing atoms of activated halogen;
   (c) Lewis acids; and
   (d) Compounds represented by the formula X'ₙMeY'ₘ in which X' is an atom of halogen, Y' is oxygen, sulphur or a functional group selected from the alkoxy, ester, amide, alkyl, cycloalkyl, aromatic, arene, phosphine, acetylacetone and oxime radicals; Me is a metal chosen from Ti, Sn, Zn, Si, B, Al, Hg, Pb, W, Sb, Ge, V, Zr, As, Bi and Mo; and m and n are whole numbers whose sum is equal to the valency of Me except in the case in which Y is oxygen or sulphur, when it becomes 2m+n; and wherein the molar ratio between compound (ii) and compound (i) is less than 1.

2. Process according to Claim 1 wherein the molar ratio between compound (ii) and compound (i) is between 0.5 and 10⁻⁴.

3. Process according to Claim 1, wherein the metalorganic compound of aluminum is a member of the group consisting of AlEt(OEt)Cl, Al isobut (O-isobut)Cl, AlEt(OEt)Br, AlEt(OEt)I, AlEt(SEt)Cl.

4. Process according to Claim 1 wherein compound (b) is selected from TiCl₄, Ti(On.C₄H₉)Cl₃, SnCl₄, VOCl₃, ter-butylchloride, HCl, Hbr and t-butyl-bromide.

5. Process according to Claim 1, wherein the polymerization reaction is effected in the presence of a reaction medium selected from the aliphatic, aromatic, cycloaliphatic, mono- and polyhalogenated hydrocarbons.

6. Process according to Claim 5, wherein the reaction medium is methylchloride.

7. Process according to Claim 1, wherein the reaction is conducted at a temperature in the range between −100 and +30° C.

8. Process according to Claim 1, wherein the isobutylene is copolymerized with isoprene.

9. Process according to Claim 8, wherein isobutylene and isoprene are fed to the zone of reaction in quantities varying from 90 to 99.5% of isobutylene by weight and from 10 to 0.5% of isoprene by weight.

10. Process for the production of copolymers of isobutylene and a conjugated diene, wherein the polymerization reaction is conducted in the presence of a catalyst system including (i) an aluminum compound containing no Al—C bond and having the general formula Al(YR")X₂ in which R" is an alkyl, cycloalkyl, acyl or aryl radical; Y is an atom of oxygen or sulphur, or nitrogen bound to tw hydrocarbon radicals; and X is an atom of halogen; and (ii) a co-catalyst selected from the following:
   (a) Brönsted acids;
   (b) alkyl haloids, haloids of organic or inorganic acids, or compounds containing atoms of activated halogen;
   (c) Lewis acids; and
   (d) Compounds represented by the formula X'ₙMeY'ₘ in which X' is an atom of halogen, Y' is oxygen, sulphur or a functional group selected from the alkoxy, ester, amide, alkyl, cycloalkyl, aromatic, arene, phosphine, acetylacetone and oxime radicals; Me is a metal chosen from Ti, Sn, Zn, Si, Al, Hg, Pb, W, Sb, Ge, V, Zr, As, Bi and Mo; n and m are whole numbers whose sum is equal to the valency of Me, except in the case in which Y is oxygen or sulphur when it becomes 2m+n, m may be also zero; and wherein the molar ratio between compound (ii) and compound (i) is less than 1.

11. Process according to Claim 10 wherein the molar ratio between compound (ii) and compound (i) is between 0.5 and 10⁻⁴.

12. Process according to Claim 10, wherein the aluminum compound is selected from AlCl₂OCH₃, AlCl₂OC₂H₅ and AlBr₂OCH₃.

13. Process according to Claim 10, wherein compound (ii) is a member of the group consisting of TiCl₄, AlEtCl₂, SnCl₄, AlCl₃, ter-butyl-chloride.

14. Process according to Claim 10, wherein the polymerization reaction is effected in the presence of a reaction medium selected from aliphatic, aromatic, cycloaliphatic, mono- and poly-halogenated hydrocarbons.

15. Process according to Claim 14, wherein the reaction medium is methylchloride.

16. Process according to Claim 10, wherein the reaction is conducted at a temperature in the range between −100 and +30° C.

17. Process acording to Claim 10, wherein the isobutylene is copolymerized with isoprene.

18. Process according to Claim 10, wherein isobutylene and isoprene are fed to the zone of reaction in quantities varying from 90 to 99.5% of isobutylene by weight and from 10 to 0.5% of isoprene by weight.

References Cited

UNITED STATES PATENTS

| | | | |
|---|---|---|---|
| 2,905,661 | 9/1959 | Muehlbauer et al. | 260—94.8 |
| 3,631,013 | 12/1971 | Horie | 260—85.3 R |
| 3,493,549 | 2/1970 | Uemura et al. | 260—85.3 R |
| 2,581,154 | 1/1952 | Walsh, Jr., et al. | 260—85.3 R |
| 2,931,791 | 4/1960 | Ernst et al. | 260—85.3 R |

FOREIGN PATENTS

| | | | |
|---|---|---|---|
| 1,032,265 | 6/1966 | Great Britain | 260—85.3 R |

JOSEPH L. SCHOFER, Primary Examiner

A. HOLLER, Assistant Examiner

U.S. Cl. X.R.

260—79.5 C, 83.5, 94.8

UNITED STATES PATENT OFFICE
CERTIFICATE OF CORRECTION

PATENT NO. : 3,850,897
DATED : November 26, 1974
INVENTOR(S) : Aldo Priola, Sebastiano Cesca and Giuseppe Ferraris It is certified that error appears in the above-identified patent and that said Letters Patent are hereby corrected as shown below:

In the heading, line 9, after "31,727/71" insert --and application Italy, July 27, 1972, 27,491/72--.

Column 5, line 45, "($Pm_4$ = 250,000)" should read --($Pm_v$ = 250,000)--.

line 67, "catalyst" should read --co-catalyst--.

Column 6, Table 4, line 2 of "(1)" under heading "Catalyst" delete --isobuset--.

line"(5)" under heading "Cocatalyst" correct the line to read --$SnCl_4$, 0.2 mmoles--.

UNITED STATES PATENT OFFICE
CERTIFICATE OF CORRECTION

Patent No. 3,850,897          Dated November 26, 1974

Inventor(s) Aldo Priola, Sebastiano Cesca and Giuseppe Ferraris

It is certified that error appears in the above-identified patent and that said Letters Patent are hereby corrected as shown below:

Column 7, line 39, correct spelling "corresponding".

Column 9, line 56, after "hydrogen" insert --alkyl--.

Column 10, line 37, correct spelling of "two"

Column 11, line 3, correct spelling of "according".

Signed and sealed this 15th day of July 1975.

(SEAL)
Attest:

RUTH C. MASON
Attesting Officer

C. MARSHALL DANN
Commissioner of Patents
and Trademarks